(12) United States Patent
Tian

(10) Patent No.: US 7,220,938 B2
(45) Date of Patent: *May 22, 2007

(54) SYSTEM AND METHOD FOR REMOVING PARTICULATE CREATED FROM A DRILLED OR CUT SURFACE

(76) Inventor: Dacheng Tian, 16238 SW. 20th St., Miramar, FL (US) 33027

( * ) Notice: Subject to any disclaimer, the term of this patent is extended or adjusted under 35 U.S.C. 154(b) by 6 days.

This patent is subject to a terminal disclaimer.

(21) Appl. No.: 10/868,487

(22) Filed: Jun. 15, 2004

(65) Prior Publication Data
US 2005/0242074 A1  Nov. 3, 2005

Related U.S. Application Data

(63) Continuation of application No. 10/335,997, filed on Dec. 31, 2002, now Pat. No. 6,756,564.

(60) Provisional application No. 60/344,904, filed on Dec. 31, 2001.

(51) Int. Cl.
*B23K 26/38* (2006.01)
*B23K 26/14* (2006.01)

(52) U.S. Cl. .............................. 219/121.7; 219/121.71; 219/121.84

(58) Field of Classification Search ............. 219/121.7, 219/121.71, 121.84
See application file for complete search history.

(56) References Cited

U.S. PATENT DOCUMENTS 3,979,789 A * 9/1976 Peabody et al. ............... 15/349
4,027,137 A * 5/1977 Liedtke .................... 219/121.7
4,088,864 A * 5/1978 Theeuwes et al. ..... 219/121.71
5,166,493 A * 11/1992 Inagawa et al. ....... 219/121.71
5,294,770 A * 3/1994 Riddle et al. ............ 219/121.7
5,304,357 A * 4/1994 Sato et al. ............. 219/121.62
5,376,771 A * 12/1994 Roy ..................... 219/121.71
5,399,828 A * 3/1995 Riddle et al. ............ 219/121.7
5,763,855 A * 6/1998 Shioji ..................... 219/121.84
5,783,793 A * 7/1998 Emerton et al. ....... 219/121.71
5,906,760 A * 5/1999 Robb et al. ............ 219/121.67
6,057,525 A * 5/2000 Chang et al. .......... 219/121.73
6,285,000 B1 * 9/2001 Gawa et al. ............. 219/121.7
6,531,682 B1 * 3/2003 Guttler ................. 219/121.84
6,756,564 B2 * 6/2004 Tian ...................... 219/121.71
2003/0005800 A1 * 1/2003 Czarnek et al. ................ 83/24

FOREIGN PATENT DOCUMENTS

JP 4-327389 A * 11/1992 ............. 219/121.7
JP 8-39279 A * 2/1996
JP 11-47973 A * 2/1999
WO WO-99-38643 A * 8/1999

\* cited by examiner

*Primary Examiner*—Geoffrey S. Evans
(74) *Attorney, Agent, or Firm*—Hedman & Costigan, P.C.

(57) ABSTRACT

A system and method for receiving and collecting particulate matter from drilled or cut holes in a tablet on a turntable and transporting said particulate to a remote location is described.

20 Claims, 3 Drawing Sheets

SYSTEM AND METHOD FOR REMOVING PARTICULATE CREATED FROM A DRILLED OR CUT SURFACE

REFERENCE TO RELATED APPLICATION

This is a continuation application of U.S. patent application Ser. No. 10/335,997 filed Dec. 31, 2002, now U.S. Pat. No. 6,756,564, which is a non-provisional application that claims priority to provisional application Ser. No. 60/344,904 filed Dec. 31, 2001.

FIELD OF THE INVENTION

This invention relates to the removal of particulate from a drilled or cut surface. More particularly, the subject invention concerns a system and method useful for removing particulates created from drilling pharmaceutical tablets, said system and method being characterized by effectively removing the particulates from the site of tablet drilling, collecting said particulate, and transporting the particulate to a remote location without altering the position of the tablet.

BACKGROUND OF THE INVENTION

Industrial drilling and cutting presents an ever-present problem concerning the removal of particulate matter formed by the drilling or cutting process. In manual and automated drilling and cutting processes, the particulate usually serves no useful purpose. In many situations, the particulate creates an undesirable environment around the drilling or cutting site and may interfere with subsequent drilling in a repetitive drilling or cutting situation. When the drilling relates to industrial processing of precious metals, e.g. gold or platinum, it is usually desirable to collect and reprocess the collected particulate. In other instances, where the waste particulate has little to no value it is desirable to remove and dispose of the created particulate.

An example of particulate matter that is desirable to remove and dispose of ocurrs in the pharmaceutical industry. Much effort has been devoted to the continued development and improvement of controlled release pharmaceutical formulations. The use of controlled release formulations can facilitate patient compliance with a particular dosing regimen. One known method employed for producing controlled release tablets is to provide a coating surrounding a tablet core containing an active ingredient, and to incorporate in that coating a hole or plurality of holes to allow fluid to penetrate through the membrane. The active ingredient in the tablet core is dissolved or suspended by the fluid penetrating the membrane and then exits the tablet through the hole in order to provide bioavailability of the active ingredient. It is important for consistent bioavailability that the hole has a precise size and shape. Accordingly, the procedure for hole formation must be precisely controlled such that each tablet is formed with a hole or holes that are consistently reproducible in diameter, depth and location on the tablet in order that the tablets exhibit substantially similar characteristics regarding drug release.

The particulate matter formed during the drilling of these holes can interfere with the precise formation of the hole. Once a tablet is drilled, the particulate matter that is created by the drilling process can become airborne in the vicinity of the drilling. This poses two problems. First, the particulate matter may be deposited on or near the laser lens, which may interfere with subsequent drilling of tablets. If the laser firing is not consistent or the precision is not reproducible for each tablet, the uniformity in size, shape, and depth of the holes that are formed can be negatively affected. Current Good Manufacturing Practice demands uniformity of drug delivery. If the holes cannot be drilled in a consistent and reproducible manner, it will alter the uniformity of delivery.

Another problem that can arise in the tablet drilling process is that the resulting particulate matter can settle back onto a tablet surface or resettle into the hole, which has been drilled into a tablet. Resettling of particulate matter into a hole that has been drilled may alter the release characteristics of the tablet. This also can result in lack of uniform release among tablets that are otherwise identical. Therefore what is needed is a means for removing the particulate matter from the region of drilling, and transporting or collecting of the particulate matter away from a tablet after it has been drilled.

Machines which are suitable for the laser drilling of tablets are described in U.S. Pat. Nos. 5,294,770, 5,399,828, and 5,783,793, which are incorporated herein by reference. Of the machines commercially available, great effort has been taken to ensure the precision, accuracy and reproducibility of the laser mechanism. However, the processing factor of particulate removal from the drilling site has been neglected in currently available laser drilling machines.

SUMMARY OF THE INVENTION

The subject invention concerns an apparatus and system for removing particulate created from a drilled or cut surface. The subject invention has many applications such as industrial drilling of precious metals, metals, precious stones, stones, pharmaceutical tablets, and any other setting where particulate is created from drilling or cutting. The term "drilling" refers to any method in which matter is removed to create an orifice. These drilling methods may include, but would not be limited to drilling with a drill bit, boring, or using a laser to create a hole. The term "cutting" is intended to include any manner in which substrates are severed. Therefore, "cutting" would include, but would not be limited to, using a blade, laser, or any other means by which substrates are severed. It is contemplated the subject invention is useful for any setting where particulate matter is created.

One embodiment of the system according to the subject invention includes:

A system for removing particulate formed by a drilling or cutting device, said system comprising:
 a) a compressed gas source directed to a drilling or cutting site to mobilize residual particulate matter created by the drilling or cutting device; and
 b) an apparatus for receiving, transporting and collecting, and transporting said residual particulate away from said drilling or cutting site.

The apparatus is a vacuum chamber having first an second ends, wherein said first end is connected to a vacuum source; and said second end is for receiving said residual particulate material.

In the system, airflow may be negative pressure created by a vacuum source or positive pressure created by a directed stream of compressed gas. The system further comprises a directed stream of compressed gas in which said the direction of the compressed gas is aimed at said drilling site. The compressed gas may be compressed air or inert gas. The term "inert gas" refers to noble gasses, nitrogen, any combination thereof, or any non-reactive gas or mixture of gasses. In a preferred embodiment, nitrogen is the compressed gas.

The system further provides for collecting particulate created during drilling or cutting. The term "collecting" is meant to include removing, transporting and collecting the created particulate. The system for collecting said particulate material further comprises, a vacuum chamber having a first end connected to a vacuum source and a second end which has at least one receiving inlet for receiving said particulate material. The vacuum chamber is formed with receiving inlets such that they may be placed above, below or above and below the surface of the drilled tablet.

It is an object of this invention to provide for an apparatus and method for removing and collecting particulate matter created from a drilling or cutting site.

It is a further object of this invention to provide an apparatus for removing particulate matter without disrupting the precision and accuracy of the drilling or cutting process or the position of the surface to be drilled or cut.

It is another object of this invention to provide an apparatus for removing particulate matter as soon as it is formed in order to prevent any particulate matter from redepositing or resettling on the drilled or cut surface during processing.

It is still a further object of this invention to provide an apparatus for transporting the removed particulate material away from the site of drilling or cutting.

It is still a further object of this invention to provide an apparatus for collecting the removed particulate material in a pharmaceutically acceptable manner for disposal. A pharmaceutically acceptable manner would be a manner such that no materials or methods are present that will adulterate the integrity of pharmaceutical products.

It is another object of this invention to provide a method by which particulate matter from drilled pharmaceutical tablets are collected and transported away from the site of drilling using the apparatus and system of the subject invention.

DETAILED DESCRIPTION OF THE PREFERRED EMBODIMENT

Figure 1:
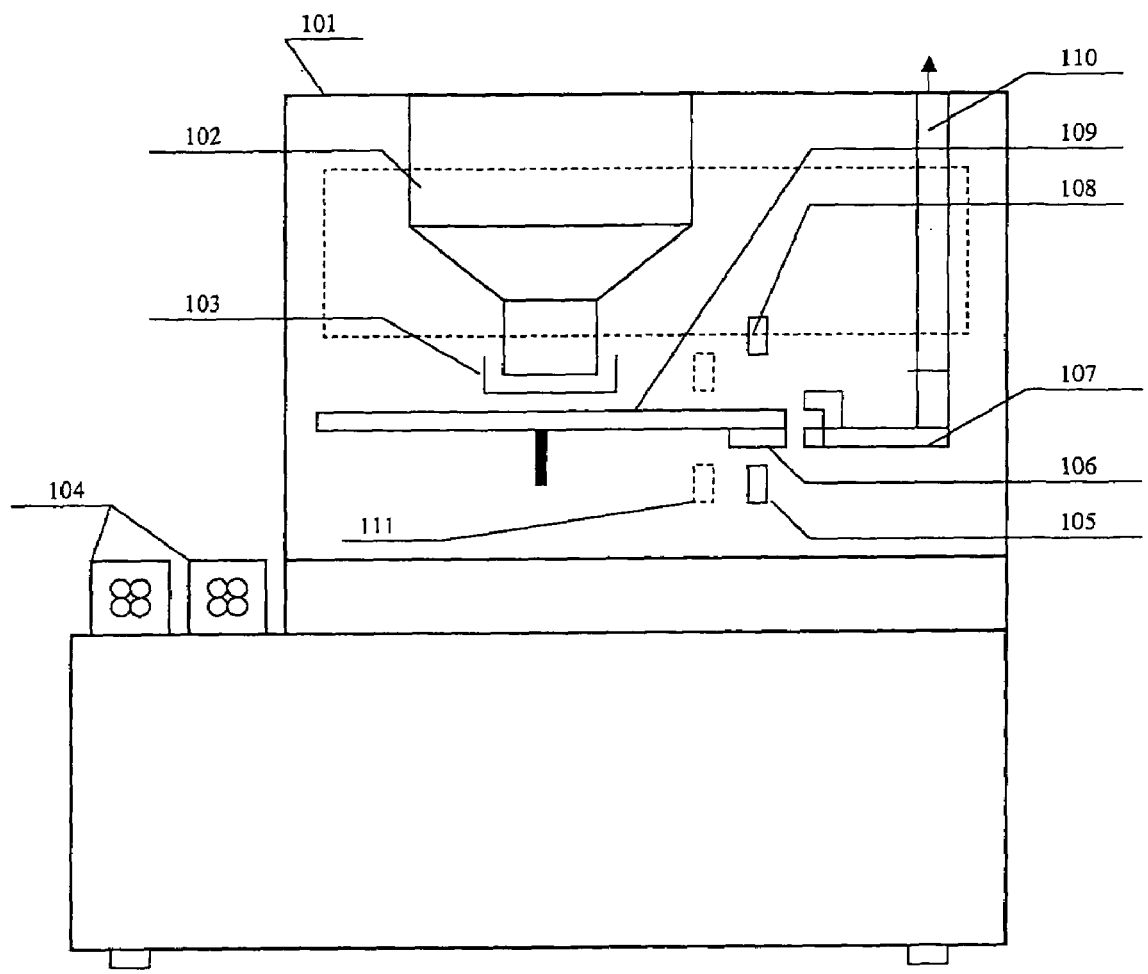
FIG. 1 shows a perspective view of a drilling system configured with a particulate removal apparatus according to one embodiment of the subject invention.

The subject invention concerns system and method for removing particulate matter created from drilling or cutting, removing said particulate from the area of drilling or cutting, transporting the particulate, and collecting said particulate in a remote location in a manner so as not to interfere with the drilling or cutting process on the substrate being drilled or cut, any subsequent substrate being drilled or cut, or the position or orientation of the substrate to be drilled or cut.

In one embodiment, the subject invention concerns system and method for removing particulate matter, wherein said system and method is suitable for use in processing pharmaceutical dosage forms, e.g. laser drilled tablets.

It is commonly known to those with ordinary skill in processing pharmaceutical products that a dosage form e.g. tablet, caplet, capsule, or the like, can be formed having a perforation or hole in an outer membrane so that fluid can pass through the membrane and contact the underlying material. One method of forming a hole or holes in the membrane in an automated process wherein the pharmaceutical products are transported to a specific site and positioned for drilling. The subject invention can advantageously facilitate removal of particulate generated by the drilling process.

In a preferred embodiment, the subject invention can comprise a nozzle for transporting a compressed gas is aimed at the tablet in a concurrent and collinear fashion with the drilling mechanism. By "concurrent", it is meant that gas is delivered to the drilling site either during, or immediately after drilling, and encompasses a gas delivered at a constant rate throughout processing, as well as any gas at a periodic rate e.g., pulsed.

The term "collinear" is meant to describe the general path and orientation of the compressed air being delivered. Preferably, the path of the compressed gas travels in a stream parallel or near parallel direction in relation to the path of the laser such that the compressed gas is aimed to contact the tablet at the site where drilling occurred. The compressed gas used is preferably an inert, non-flammable gas, and can include compressed air, noble gases or most preferably nitrogen. In a preferred embodiment, the gas is applied in a constant and steady stream. Alternatively, the compressed gas may be delivered in pulses, which may pulse relative to the firing of the laser.

In order to understand the function of the system of the subject invention, it is preferred to describe it in relation to the other elements involved in the drilling process. The drilling process begins when a tablet is determined to be in the proper position for drilling by a detection mechanism. Such tablet detection mechanisms are commonly known in the art. Once a tablet has been detected in the transportation apparatus, the drilling mechanism, which is preferably a laser drill, receives a signal which identifies the position of a tablet so that the laser mechanism fires a pulse when the tablet passes in front of the laser lens. The laser mechanism typically used in the pharmaceutical industry for drilling tablets is a 150 W $CO_2$ laser, capable of a pulse frequency of 1–20,000 Hz, a pulse width of 25–1000 microseconds, and pulse energy of 10–350 millijoules. The laser can be used in the process of drilling one or more holes on a single side, on both sides, or any combination thereof.

The user is able to regulate the firing and all physical parameters of the laser firing, which can include the number of drilled holes, the position on the tablet of the drilled holes, the diameter of the drilled holes, the depth of the drilled holes, the timing of the laser firing, the frequency of the laser, and the duration of the firing through a user operated controlling means. The user, through use of a controller, regulates certain parameters of the laser firing. These user-controlled parameters typically include, but would not be limited to the number of orifices created, the side or sides in which the orifices are created, and the spatial orientation of the orifice or orifices on the tablet. The controller can be either a single unit control device for controlling all lasers in use, or more preferably, the system can be provided with a separate controlling device for each laser.

The drilling can be programmed to occur on either a single face, or both faces of the tablet. Through user set parameters, the laser can precisely and consistently drill holes in the range of 0.20 mm to 0.95 mm diameter. The system is designed such that precise positioning of each hole remains consistent throughout the process. Positioning refers to holes drilled in center, off center, more than one hole drilled equidistant to the center and other positions as desired. Said positioning of any hole or holes needs to be consistently placed on each tablet throughout processing in order to ensure uniformity in drug release.

At the site of drilling, matter is removed from the tablet thus creating a hole. The removed matter is typically particulate which becomes airborne in the area around the drilling site. Compressed gas is applied to the drilling site concurrent and collinear with the laser pulse used to create the hole, either continuously or in pulses synchronized with the laser pulses, to the site of drilling.

The compressed gas advantageously keeps the particulate airborne. There are three distinct advantages to keeping the particulate airborne. First, the compressed gas moves the airborne particulate away from the laser drill lens, preventing the particulate from settling and accumulating on the laser lens so that accumulated particulate does not interfere or alter the path of subsequent laser pulses. Second, the compressed gas moves the particulate away from the tablet to prevent the airborne particulate from settling back onto the drilled tablet or any subsequent tablets moving along the transportation apparatus. If particulate were to deposit in the recently drilled hole, it may partially or fully fill the hole and alter the release characteristics of the medicament exiting from the tablet core through the hole. Third, the compressed gas keeps the particulate airborne long enough to be drawn into a collection apparatus and moved to a remote location for ease of disposal. When the collection apparatus is connected to a source of vacuum, a negative pressure is created in the region immediately adjacent to the drilling site, whereby particulate created during the drilling process is drawn into the collection apparatus by vacuum. The particulate matter created by drilling travels into the vacuum collection apparatus and is transported and deposited into a collection bin positioned remotely from the site of drilling.

FIG. 1 shows a schematic side view of a laser tablet drilling system as is known in the art, and shows such system configured to include the system components of the subject invention. An enclosure 101 houses the components of the laser drilling system. The enclosure may be glass, plastic, metal, any combination thereof, or any other material suitable for use in a pharmaceutical manufacturing environment. The hopper 102 is placed above a tablet feeder 103 which deliver the tablets to turntable 109. The turntable has formed tablet positioning portions about the outer circumference. These formed tablet positioning portions can hold individual tablets. As the turntable revolves, individual tablets directed from the hopper by the tablet feeder are deposited into each of these formed portions. When positioned on the turntable, the tablets pass photo sensors 111 which act in concert with either or both lasers housed within manifolds 105 and 108 to fire a laser pulse at a passing tablet to drill the desired hole or holes in the tablet. Particulate created from the drilling is moved away from the drilling site by a compressed gas stream directed at the tablet from compressed gas nozzle housed within manifolds 105 and 108. The particulate remains airborne by the pressure applied by the compressed gas. This airborne particulate can then be directed into vacuum apparatus 107 and carried away from the system through exhaust vent 110. Controllers 104 allow the user to individually control upper laser housed in manifold 108 and lower laser housed in manifold 105. There may be one controller to direct all laser pulses, or each laser may have its own separate controller. FIG. 1 shows an embodiment in which two controllers are used, each controlling one of the respective two lasers.

Figure 2:
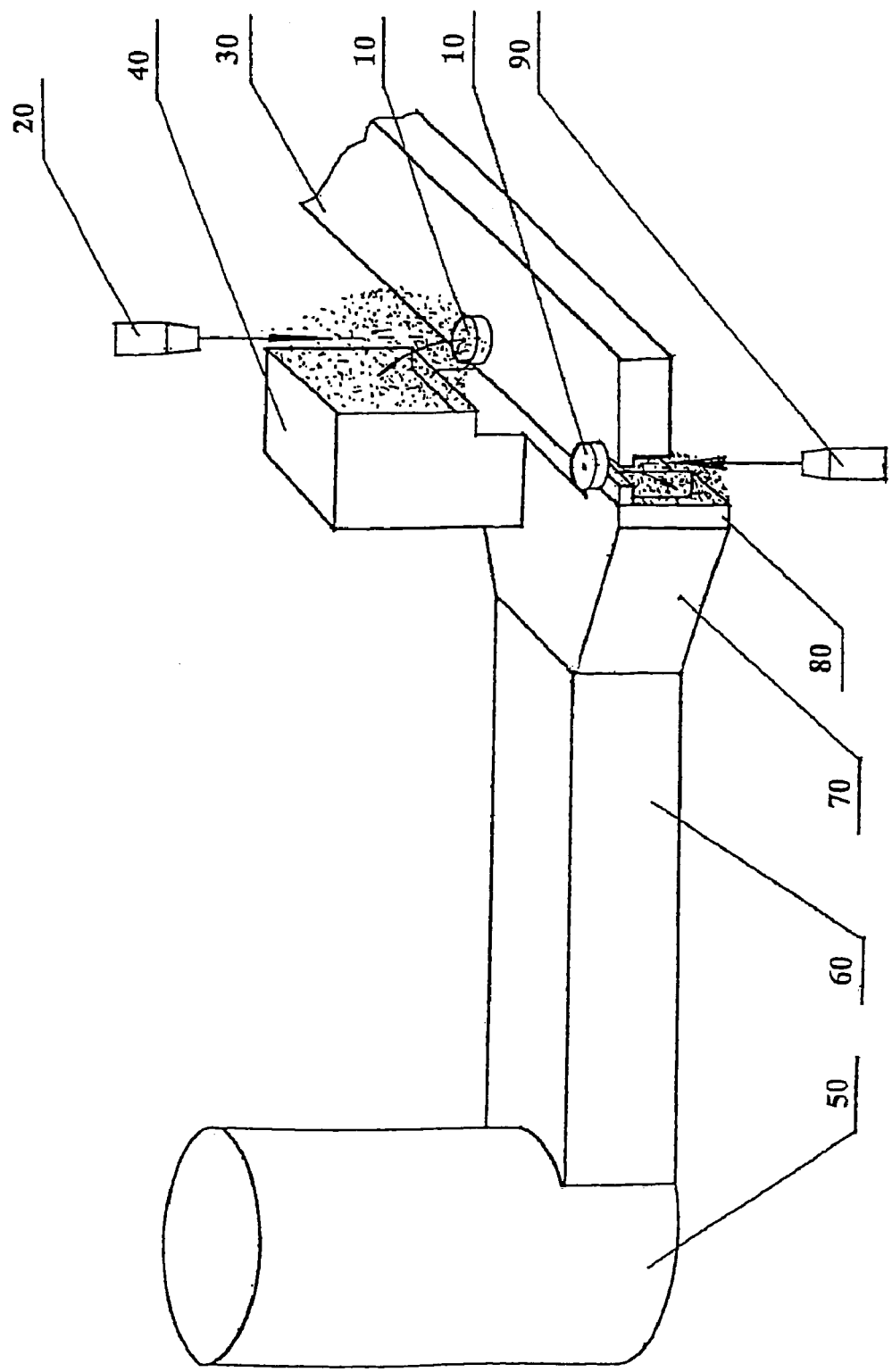
FIG. 2 shows a side view of an embodiment of the system components according to the subject invention.

FIG. 2 shows a perspective view of a close up arrangement of the apparatus (seen in FIG. 1 as vacuum apparatus 107) of the subject invention and the arrangement to various proximate elements of the laser drilling system. In a preferred embodiment, a tablet 10 is carried by a turntable 30 which transports tablet 10 into a position in the path of a laser emitted from a laser lens held within manifold 20. As would be understood by persons of ordinary skill in the art, the transport system may be a means other than a turntable, so long as the transport system will place individual tablets in the path of the laser pulse. Concurrent and collinear with the path of the laser is a stream of compressed air or gas, which may be delivered either continuously, or alternatively in synchronized pulses with the laser. In the embodiment shown in FIG. 2, the nozzle delivering the compressed gas is contained in manifold 20 with the laser lens. In an alternative embodiment, the nozzle delivering the compressed gas may be arranged in a manner such that it is not in the same manifold as the laser lens. Preferably, the compressed gas is compressed air, noble gases or nitrogen.

In one embodiment, a second manifold 90 may be provided to house an additional laser lens and a nozzle to deliver compressed gas for processing an additional drilling site. As with manifold 20, manifold 90 may house both the laser lens and the nozzle for delivering the compressed gas. In an alternative embodiment, the nozzle delivering the compressed gas may be arranged in a manner such that it is not in the same manifold as the laser lens. In this embodiment, lasers are positioned in a manner to drill on upper and/or lower lateral faces. However, all other possible drilling arrangements are envisioned in the subject invention. This would include, but not be limited to, drilling on any one or combination of lateral faces, vertical faces, or tablet edges where lateral and vertical faces meet.

FIG. 2 further depicts drilling of a tablet 10 on the upper face, creating particulate matter 55 as a fine powder. If the tablet is drilled from the lower face, particulate matter 65 is created as a fine powder. The particulate matter created from a tablet drilled on the upper face from laser source emitted from within manifold 20. The compressed gas from a nozzle housed within manifold 20 keeps the particulate from resettling and further keeps the particulate airborne long enough such that it is directed into the receiving inlets. The particulate matter 55 is drawn into upper receiving inlet 40 by a region of pressure created in the area of said receiving inlet 40. In this embodiment the region of pressure is negative pressure created by a vacuum source, which is connected to the apparatus at the first end 50 at the end opposite to the second end, which is receiving inlet. In this embodiment, the region of negative pressure requires a facial velocity of air entering receiving said upper inlet 40 and lower receiving inlet 80 at a velocity of between 300 ft$^3$/min and 500 ft$^3$/min. The cross sectional area of the vacuum connection area 50 should be sufficient to maintain a velocity of air between 200 ft$^3$/min. and 4500 ft$^3$/min. Additionally, the entire apparatus should be designed so that the total static pressure loss from source to inlet is less than 70%. The apparatus shown is only one embodiment of the invention. It can be formed in any manner such that the level of pressure proximate to the tablet is sufficient to direct the particulate into the apparatus but must not such that it will exceed a level of pressure that will alter the position of the tablet. Alternatively, the pressure can be a positive pressure from a stream of compressed air or gas wherein the stream directs the particulate towards an inlet.

The tablets may be drilled from below, and, if so drilled, will create particulate 65 which is drawn into lower receiving inlet 80 in a manner similar to said manner of upper receiving inlet 40. The lower receiving inlet 80 must satisfy the same physical parameters as to air volume and airflow outlined for upper receiving inlet 40. Particulate matter that is collected from upper receiving inlet 40 and lower receiving inlet 80 are further drawn into the apparatus into accumulator 70. The particulate matter is then transported within chamber 60 and exits the apparatus through vacuum connection area 50 where it is collected in an area away from the drilling site. The apparatus comprises of two receiving inlets in order to accommodate many different drilling scenarios. Tablets may have one or more holes drilled from above, below, or above and below and still have particulate removed by the apparatus.

Figure 3:
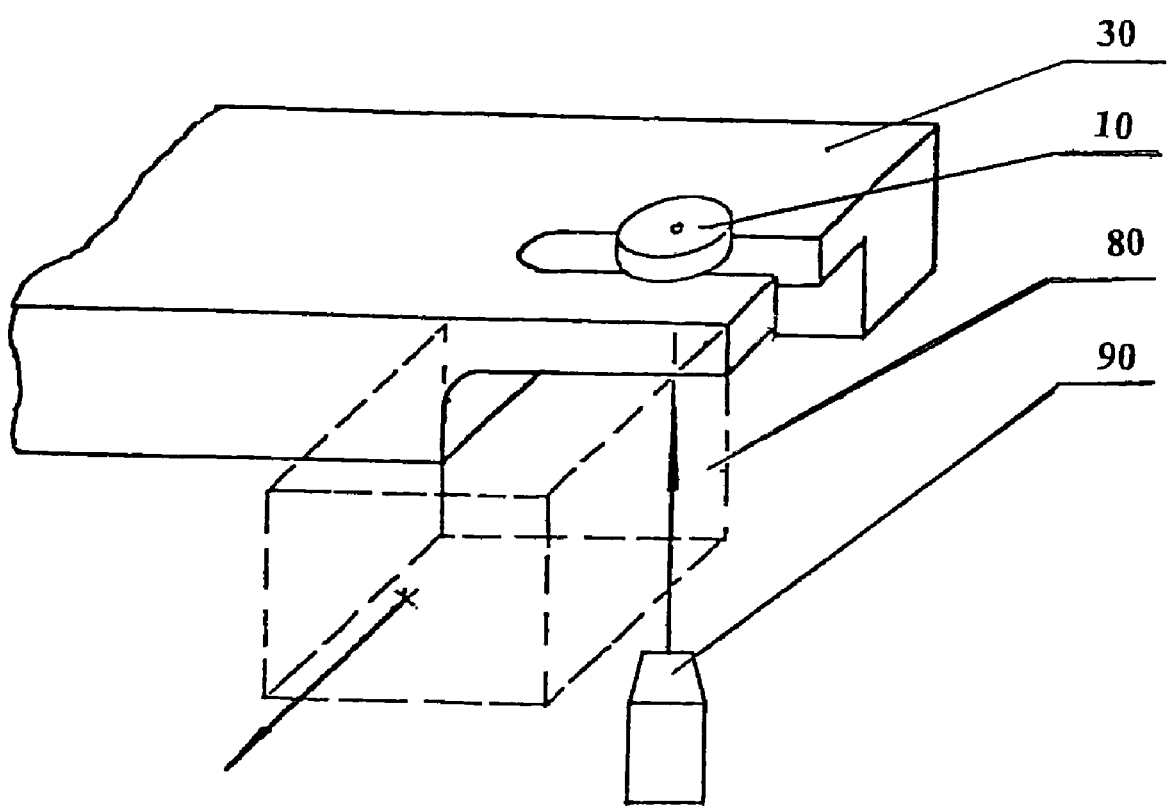
FIG. 3 shows a side view of an embodiment of the system components according to the subject invention as depicted in FIG. 2, in further close up view.

FIG. 3 is a perspective view schematically illustrating certain of f the aforementioned elements of FIG. 2 in additional close up. Tablet 10 is brought into position by transport system 30 such that a laser lens housed with manifold 90 may direct a laser pulse to the underside of said tablet. The particulate created by the drilling will be drawn into the apparatus into lower receiving inlet 80 as previously described.

An overall method for using the system for removing particulate from a laser drilled tablet comprising the steps of:
- a) providing a vacuum collection apparatus to a source of vacuum;
- b) providing a stream of compressed gas concurrently and collinearly with the direction of all laser pulses;
- c) firing a laser from one or more laser sources;
- d) said laser source is instrumental in drilling an orifice into a tablet by removing matter from a tablet in a manner to create an orifice; and
- e) transporting said removed matter from the site of drilling.

Generally, the invention has been described in its preferred form or embodiment with some degree of particularity, it is to be understood that this description has been given only by way of example and that numerous changes in the details of construction, fabrication and use, including the combination and arrangement of parts, may be made without departing from the spirit and scope of the invention.

I claim:

1. A system for removing particulate formed on the surface of a pharmaceutical tablet by a drilling device, said system comprising:
   - a. a compressed gas source directed collinearly with the direction of said drilling device to mobilize residual particulate matter created on the surface of a pharmaceutical tablet by the drilling device; and
   - b. an apparatus for receiving, transporting and collecting, and transporting said residual particulate away from said drilling site wherein said apparatus provides a facial air flow rate of 300–500 ft$^3$/min at an opening adjacent to a site of drilling so both the compressed gas and facial air flow rate provided from said apparatus does not interfere with the orientation of the tablet.

2. The system of claim 1 wherein said system further comprises a vacuum source for transporting said residual particulate material.

3. The system of claim 1 where said compressed gas is compressed air, inert gas, or nitrogen.

4. The system of claim 3 where said compressed gas is nitrogen.

5. The system of claim 1 where said apparatus for receiving, transporting, and collecting, said residual material comprises: a) a vacuum chamber having first and second ends, wherein said first end is connected to a vacuum source; and
   - b) said second end is for receiving said residual particulate material.

6. The system of claim 5 wherein said second end for receiving said residual particulate material is adjacent to said drilling site.

7. The system of claim 5 wherein said second end for receiving said residual particulate material is placed above the drilling site.

8. The system of claim 5 wherein said second end for receiving said residual particulate material is placed below the drilling site.

9. The system of claim 5 wherein said second end for receiving said residual particulate material further comprises two inlets and is placed above and below the drilling site.

10. A method for removing particulate from the surface of a pharmaceutical tablet at a drilling site comprising the steps of:
    - a. providing a vacuum collection apparatus connected to a source of vacuum, said vacuum being sufficient to provide a facial flow rate at an opening adjacent to the site of drilling 300–500 ft.$^3$/min;
    - b. directing a stream of compressed gas concurrently and collinearly with the direction of all laser pulses at a tablet where laser drilling occurs on said tablet;
    - c. firing a laser from one or more laser sources, to drill an orifice into the tablet; and
    - d. transporting particulate from the site of drilling.

11. The method of claim 10 where said orifice has a diameter of 0.20 mm to 0.95 mm.

12. The method of claim 10 where the cross sectional area of the vacuum connection area is sufficient to maintain a flow rate of between 200 ft$^3$/min and 4500 ft$^3$/min.

13. The method of claim 10 where one laser source is used.

14. The method of claim 10 where 2 laser sources are used.

15. The method of claim 14 where said laser sources are controlled by a single controller.

16. The method of claim 14 where each of said laser sources has an independent controller.

17. The method of claim 10 where drilling occurs on one side of said tablet.

18. The method of claim 10 where drilling occurs on both sides of said tablet.

19. The method of claim 10 where one orifice is drilled on each tablet.

20. The method of claim 10 where more than one orifice is drilled on each tablet.

* * * * *